United States Patent
Winkelmann et al.

(10) Patent No.: US 10,976,842 B2
(45) Date of Patent: Apr. 13, 2021

(54) TOUCH SCREEN CONTROL PANEL AND KITCHEN APPLIANCE COMPRISING SUCH A CONTROL PANEL

(71) Applicant: Electrolux Appliances Aktiebolag, Stockholm (SE)

(72) Inventors: Klaus Winkelmann, Rothenburg ob der Tauber (DE); Roberto Ferrozzi, Rothenburg ob der Tauber (DE); Adriano Scotto D'Apollonia, Forli (IT)

(73) Assignee: Electrolux Appliances Aktiebolag, Stockholm (SE)

( * ) Notice: Subject to any disclaimer, the term of this patent is extended or adjusted under 35 U.S.C. 154(b) by 463 days.

(21) Appl. No.: 14/906,569

(22) PCT Filed: Sep. 2, 2014

(86) PCT No.: PCT/EP2014/068593
§ 371 (c)(1),
(2) Date: Jan. 21, 2016

(87) PCT Pub. No.: WO2015/039863
PCT Pub. Date: Mar. 26, 2015

(65) Prior Publication Data
US 2016/0179235 A1    Jun. 23, 2016

(30) Foreign Application Priority Data
Sep. 19, 2013 (EP) .................... 13185073

(51) Int. Cl.
*G06F 3/041* (2006.01)
*F24C 7/08* (2006.01)

(52) U.S. Cl.
CPC .............. *G06F 3/041* (2013.01); *F24C 7/081* (2013.01); *F24C 7/086* (2013.01)

(58) Field of Classification Search
CPC .................................. F24C 7/081; F24C 7/086
See application file for complete search history.

(56) References Cited

U.S. PATENT DOCUMENTS

| 6,016,134 A | 1/2000 | Ota |
| 8,393,319 B2 * | 3/2013 | Hoffmeier ............. F24C 15/006 126/190 |

(Continued)

FOREIGN PATENT DOCUMENTS

| CN | 102012051 A | 4/2011 |
| EP | 1437919 A2 | 7/2004 |

(Continued)

OTHER PUBLICATIONS

International Search Report for PCT/EP2014/068593 dated Nov. 27, 2014, 2 pages.

(Continued)

*Primary Examiner* — William Boddie
*Assistant Examiner* — Bipin Gyawali
(74) *Attorney, Agent, or Firm* — Pearne & Gordon LLP

(57) ABSTRACT

Touchscreen control panel (3) configured to be implemented with a kitchen appliance (1), preferably with a home kitchen appliance or a commercial kitchen appliance, and operable from a front or top side of the appliance (1), wherein the touchscreen control panel (3) comprises a cover plate (4) with a transparent section (4a), a transparent touchsensitive layer (5) arranged and attached within the transparent section (4a) to the back side of the cover plate (4), a bracket frame (6) implemented at the back side of the cover plate (4) and surrounding at least partially the transparent section (4a), and a display unit (7) comprising an active display (9). The bracket frame (6) is adapted to retain the display unit (7) at the back side of the cover plate (4) preferably in such a (Continued)

way that the display unit (7) is in alignment, especially in proper alignment with the touchsensitive layer (5).

20 Claims, 4 Drawing Sheets

(56) References Cited

U.S. PATENT DOCUMENTS

| | | | | |
|---|---|---|---|---|
| 8,558,143 | B2* | 10/2013 | Segers | A47L 15/4293 |
| | | | | 219/391 |
| 9,310,095 | B2* | 4/2016 | Adamik | H05K 5/0017 |
| 9,732,963 | B2* | 8/2017 | Kozinski | F24C 5/16 |
| 2008/0122802 | A1 | 5/2008 | Furuhashi et al. | |
| 2009/0015761 | A1 | 1/2009 | Stockham | |
| 2009/0217920 | A1* | 9/2009 | Flesch | F24C 7/082 |
| | | | | 126/190 |
| 2010/0141606 | A1 | 6/2010 | Bae | |
| 2011/0148775 | A1* | 6/2011 | Rudolph | F24C 7/086 |
| | | | | 345/173 |
| 2013/0025579 | A1 | 1/2013 | May et al. | |
| 2014/0067095 | A1* | 3/2014 | Anton Falcon | H02J 3/12 |
| | | | | 700/90 |
| 2014/0078696 | A1* | 3/2014 | Matsuda | G06F 3/041 |
| | | | | 361/752 |
| 2014/0328084 | A1* | 11/2014 | Chuang | H05K 5/0017 |
| | | | | 362/623 |
| 2015/0192302 | A1 | 7/2015 | Ortner et al. | |
| 2015/0205330 | A1* | 7/2015 | Zhang | G06F 1/1626 |
| | | | | 361/679.3 |

FOREIGN PATENT DOCUMENTS

| | | |
|---|---|---|
| KR | 20040064936 | 7/2004 |
| WO | 2008056955 A1 | 5/2008 |
| WO | 2013006981 | 1/2013 |

OTHER PUBLICATIONS

English Translation of CN102012051, 4 pages.
Touch International. Multi-Touch Projected Capacitive Touch Screen Specification. Document No. 6500462, Rev. 2.0; vom 29. Mai 2013.
Opposition filed in EP2851620 dated Mar. 11, 2019, 22 pages.
Preliminary opinion of Opposition Division in EP2851620 dated Dec. 18, 2019, 17 pages.

* cited by examiner

TOUCH SCREEN CONTROL PANEL AND KITCHEN APPLIANCE COMPRISING SUCH A CONTROL PANEL

The invention is directed to a touchscreen control panel and a respective kitchen appliance comprising such a control panel.

In modern kitchen appliances, such as household or commercial kitchen appliances, in particular baking and/or cooking ovens or hobs, interfaces for operating and/or setting operational parameters may comprise touchscreen control units, in particular as respective control units which allow comfortable control. Current touchscreen control units in many cases still involve considerable mounting work and mounting effort.

It is an object of the invention to provide a touchscreen control panel for kitchen appliances, which can be mounted and assembled in an easy and in particular cost efficient way. Further, a respective appliance shall be provided. Further, an oven and a cooking hob shall be provided.

These and further objects are solved by claims 1, 13, 14 and 15. Embodiments result from respective dependent claims.

According to claim 1, a touchscreen control panel is provided. The touchscreen control panel is adapted and configured to be implemented with a kitchen appliance, in particular a household kitchen appliance or an industrial kitchen appliance. As to the type of appliances, hobs, ovens, and the like may be considered.

The touchscreen control panel is adapted and configured to be operated from a front or top side of the appliance. The proposed touchscreen control panel in particular comprises:
  a cover plate with a transparent section,
  a transparent touchsensitive layer arranged and attached within the transparent section at or to a back side of the cover plate,
  a bracket frame implemented at the back side of the cover plate, wherein the bracket frame is configured to frame, surround, border and/or encircle at least partially the transparent section, and
  a display unit comprising a display.

The transparent touchsensitive layer may be an ITO-foil (Indium Tin Oxide foil) attached, in particular glued, to a rear side of the cover plate, in particular to a rear side of the cover plate, in particular transparent section. However, any other type of touchsensitive layers or elements may be used and provided accordingly.

It shall be noted, that the term transparent relating to the cover plate and touchsensitive layer shall mean that a display of the display unit arranged behind, i.e. downstream, the cover plate and touchsensitive layer is visible through the cover plate and touchsensitive layer. Visibility in this connection shall mean that elements displayed on the display can be recognized and viewed by the user. Therefore, transparency in particular shall relate to the visible spectrum. In particular, the transparent section and touchsensitive layer, optionally additional intermediate layers, shall have a transparency in the visible spectrum in order to allow visible inspection of the display, in particular of items displayed on the display which is arranged behind the transparent section and touchsensitive layer.

The bracket frame is proposed to be implemented at the back side of the cover plate, i.e. in particular at a side averted from the side accessible for operating the touch control panel. The bracket frame may be implemented as a separate component part attached in a removable or fixed manner to the cover plate. Attachment may be implemented by at least one of gluing, screwing and caulking.

The display unit is proposed to comprise a display, i.e. a display screen, which is adapted to display information, in particular relevant for operating the appliance. The display together with the touchsensitive layer may be considered to implement a touchscreen assembly, touchscreen unit or simply touchscreen.

According to the invention, the bracket frame is preferably adapted to retain, in particular receive and/or hold, the display unit at the back side of the cover plate in such a way that the display unit is in alignment, more preferably in proper alignment, with the touchsensitive layer.

The bracket frame may be attached to the cover plate, in particular via a gluing, screwing, chaulking and/or snapping connections. However, the bracket frame or at least sections thereof may also be implemented integrally with the cover plate, in particular in or at a back side of the cover plate.

As proposed by the invention, the bracket frame, in particular a type of retaining or holding frame, is adapted to position, in the assembled state, the display unit, in particular a display, relative and in an overlapping manner with the touchsensitive layer, in particular such that a manual selection of elements displayed on the display is possible via the touchsensitive layer.

The proposed design allows a comparatively simple and cost effective, in particular automated, assembly of the touchscreen control panel.

The touchscreen control panel, in particular the cover plate may be made at least partially from at least one of plastic and metal, in particular (please specify further materials). The transparent section may be made from plastic, glass or any other suitable transparent material. The transparent section may be an integral part of the cover plate. It is also possible that the transparent section constitutes an inlay attached to or provided with a frame of the cover plate. A respective frame may be made from a plastic and/or metal material.

It shall be mentioned that the bracket frame may be adapted to arrange and fix a predefined relative orientation of the display of the display unit and the touchsensitive layer, in particular relative to and in overlap with the transparent section. In particular, the bracket frame may be laminated, glued and/or screwed to the cover plate by a robot so as to be properly aligned with the touchsensitive foil, in particular such that the display of the display unit in the end will be automatically aligned with the touchsensitive foil.

As can be seen, the proposed touchsensitive panel can be manufactured with low effort and cost. In particular manufacturing of the touchsensitive panel may be, at least largely, manufactured in an automated manner.

In embodiments, and as mentioned already further above, the touchsensitive layer may be laminated or glued to the back side of the cover plate. The touchsensitive layer may be glued to the cover plate via a robot. Preferably, the touch sensitive layer is attached to the cover plate in such a way so as to adequately, at least partially, overlap the transparent section in order to be properly aligned with the display. In particular, the bracket frame and display may be adapted such that the touchsensitive foil and display are properly and automatically aligned in the course of assembling the touchscreen control panel, i.e. in the course of mounting the display unit to the bracket frame. This also may be advantageous for automated manufacture of the touchsensitive control panel.

In embodiments, the cover plate comprises a frame member surrounding, preferably holding or supporting, the transparent section. The frame member may be made from a plastic material or a metal, in particular stainless steel. In particular, the frame member may, in particular have a plate-like shape, and be adapted to retain and bear at least the transparent section, bracket frame and/or other elements to be attached to the cover plate. In the frame member, there may be provided a recess or cutout in which the transparent section is formed as an inlay, for example.

In embodiments, the transparent section is implemented as, or implemented as a part of an inlay, preferably attached to or integrally designed with the bracket frame or frame member. In an integral design, the bracket frame or frame member and inlay may be made from plastics materials, wherein the bracket frame or frame member preferably is made from a non-transparent material and the inlay at least partially is made from a transparent material.

In the variants in which the transparent section is implemented as an inlay and attached to the bracket frame or frame member, the bracket frame or frame member for example may be made from metal, in particular stainless steel, and the inlay may be made from glass, in particular implemented as a glass plate. Instead of glass, a plastic material may be used. The inlay may be glued to the bracket frame or frame member, in particular glued to the frame member at a back side thereof.

As mentioned above, the transparent section may be implemented as or as a part of an inlay, which shall in particular mean, that the inlay is only transparent in a limited region or sector defining the transparent section, whereas the inlay is non-transparent in regions outside the transparent section. In particular, the inlay may be transparent in a section corresponding to the size of the transparent touch-sensitive layer, and may be non-transparent, in particular black or blackened, outside the transparent section.

As indicated already further above, the frame member may comprise a cutout, and the inlay may be provided and adapted to cover the cutout. In particular, the cutout and inlay may be matched to one another such that the cutout can receive the inlay, i.e. such that the size and shape of the cutout corresponds to those of the inlay. However, the inlay may be larger than the cutout and glued to a front or back side of the frame member.

In embodiments, the touchscreen control panel comprises a housing, in particular box or casing, which accommodates therein the display unit, and other elements if required. The housing may, at least partially, be made from a plastic material and/or metal. The housing and bracket frame comprise corresponding fixing elements, in particular snap elements, configured such that the housing is or can be removably connected, in particular snap-connected or snap-locked, to the bracket frame. The bracket frame and housing may be configured such that the display and touchsensitive layer are mutually aligned when the housing is snap-connected to the bracket frame.

The housing, in particular box or casing, can be pre-assembled, which shall mean that the display and optionally other elements are mounted to the housing, which in the fully assembled state can then be snapped to snap elements of the bracket frame. The housing may comprise two or more component parts, such as for example two half shells, adapted to be set together in one or more assembly steps, in particular automated assembly steps. Preferably, respective component parts can be fixed to each other by snap-locking or similar.

It shall be mentioned that fixing methods different from snap-connecting or snap-locking may be used to fix the housing to the bracket frame, such as for example shape-locking.

Note that the proposed fixing elements allow comparatively easy mounting processes for mounting the housing to the bracket frame, which may be advantageous for automated manufacture of the touchscreen control panel.

In variants, the display of the display unit may at least partially be accommodated within and attached to the housing such that a display surface of the display is visible through a cut-out window provided in the housing. The cutout window and fixing elements of the housing may be mutually aligned such that the display surface and touch-sensitive layer are properly aligned upon mounting the housing to the bracket frame. This in particular allows comparatively easy assembly of the touchscreen control panel.

In embodiments, the housing may further accommodate at least one electronics board configured to at least drive the display of the display unit. The display can be an active display. The display may be a TFT (Thin-Film Transistor) type display. The electronics board may comprise at least one processor for driving the display, in particular TFT-display. Other electronic components may be arranged and accommodated on the electronics board. Respective electronic components may be at least one of a key, buzzer, a universal serial bus (USB) adapter for service, connection elements for connecting the electronics board to a main control of the appliance, lighting element, in particular LED (light emitting diode), in- and output port for connecting to other electronic boards, and so on.

The housing in one variant may accommodate at least two electronics boards, wherein a first electronics board, a main board, may be configured to drive the display, i.e. comprise a processor for driving the display, and a second electronics board, a bridging board, may comprise or be configured to accommodate the residual or other electronic components, in particular as indicated above.

In embodiments, at least one of the at least one electronics board is arranged besides or behind the display. Behind the display in particular shall mean that a respective electronics board is arranged on a side averted from the display surface of the display.

In embodiments, the housing, display and at least one of the at least one electronics board are configured such that electric contacts between the display and the electronics board are automatically connected during assembly of the housing. In particular, the display and electronics board may be aligned or prealigned in or by the housing such that respective connector elements, in particular pins, connectors and the like, are automatically contacted during assembly of the housing. Adaption of respective components such that electric contacts are automatically established can greatly simplify manufacture of the touchscreen control panel.

It shall be noted, that the housing and respective connectors may be adapted such that the touchsensitive layer is automatically connected upon mounting the housing to the bracket frame. Here, similar contacting concepts as mentioned above may be applied.

In embodiments, the bracket frame and housing are configured such that the display surface is arranged at a predefined distance from the touchsensitive layer. In this configuration, a circumferential gap between the touchsensitive and an outer rim of the display surface may be sealed by a sealing element. The sealing element may be a gasket, in particular foam gasket or other type of sealing, which may be attached to one or more spacers provided for adjusting or setting the predefined distance between the display and touchsensitive layer.

Providing the display at a predefined distance from the touch sensitive layer may be applied with cooking hobs, where the touchsensitive layer may be attached, in particular glued, directly to a back-side of the glass ceramic pane of the hob. The distance in particular may be used to thermally separate the display from the glass ceramic pane.

In the case of this type of cooking hob, the glass ceramic pane, at least a section thereof, constitutes the cover plate of the touchscreen control panel. The transparent section may be implemented with the glass ceramic pane, which in particular shall mean that the glass ceramic pane as such and/or a respective inlay are transparent such that the display and display surface are visual through the transparent section.

For obtaining the transparent section, a transparent glass ceramic pane may be used, which may be masked for generating non-transparent regions. Such non-transparent regions may for example be located above heating elements and the like, in general above elements that shall not be visible through the glass pane.

According to claim 13, a kitchen appliance is proposed which comprises at least one touchscreen control panel as proposed herein and described above. As to advantages, reference is made to the description above and below. Appliances according to claim 13 may be selected from: cooking ovens or cooking hobs.

With respective appliances, the transparent section may be implemented in or at any section easily accessible and visible for the user. In particular the transparent section and therefore also the display and touchsensitive layer, i.e. the touchscreen assembly, may be implemented in or with a front and/or top cover or cover plate of the appliance.

According to claim 14, a cooking hob is proposed. The cooking hob comprises a cooktop with a glass pane, in particular a ceramic glass pane, and a touchscreen control panel as proposed above and further above. With the cooking hob, the transparent section is integrally formed with the glass pane of the cooktop, or formed as an insert embedded in the glass pane. In case that the transparent section is integrally formed with the glass pane, non-transparent sections may be obtained via masking or applying a paint to the lower side of the glass pane.

According to claim 15, an oven is proposed which comprises at least one touchscreen control panel as proposed herein and described above. As to advantages, reference is made to the description above and below.

In general, the touchscreen control panel may be applied to a kitchen appliance, in particular of domestic and/or industrial type.

It shall be noted, that the term "touchscreen" in particular shall mean that inputs by a user, in particular manual inputs, can be carried out by touching, tapping or moving over a touch sensitive surface or pane with a finger for example. A "touchscreen" as such may comprise a display, in particular a TFT or LC (liquid crystal) display with a transparent touchsensitive layer, element, in particular touchsensitive foil, placed or mounted upstream of the display. In this way, touching and/or tapping and/or moving on or over elements visible on the display can be detected via the touchsensitive layer and, as far as appropriate, be used for operating and/or setting operational parameters or details of the appliance.

The housing mentioned further above may comprise as a component part a carrier frame which may be adapted to carry or retain the display and/or one of the electronics boards.

In embodiments, a light deflector may be provided. The light deflector may be adapted and provided for the purpose of guiding, i.e. deflecting, light emanating from the display screen in a predefined direction towards the transparent section. It is advantageous that the display and light deflector be mutually aligned. Here, the housing may be adapted and comprise respective supports such that proper alignment is automatically obtained, in particular in the course of assembling the housing and/or touchscreen control panel. The light deflector may be adapted to be snap-connected to the bracket frame and/or housing.

The housing may be preassembled and may be mounted in a single mounting step to the bracket frame. However, it is conceivable that the housing and elements accommodated therein are successively to the bracket frame and/or cover plate.

With the proposed touchscreen control panel it is essentially possible, that all necessary or required mechanical and/or electric connections or interconnections between components of control panel and/or between the control panel and further components of the appliance are established during or upon assembly of the touchscreen control panel and/or during or upon mounting the touchscreen control panel to the appliance, respectively.

It shall be noted, that within the present application, the terms "front" and "front side" in particular shall relate to the side of the touchscreen control panel exposed to and accessible from a user of the appliance. The terms "back" or "back side" however shall relate to the side averted from the front side.

With the proposed touchscreen control panel, the size of the touchsensitive layer may be adapted to the size of a display screen of the display. However, the touchsensitive layer may be larger or smaller than the display screen, if for example touch sensitive properties shall be restricted to just a section of the display, or shall be extended beyond the display for example if touchsensitive areas shall be provided outside of the area of the display. Such touchsensitive areas may comprise fixed display elements, printings, LED's and the like.

It shall be mentioned, that for attaching the display, electronics boards, light deflector at least one of snap-connections and plug connections may be used. In particular respective connections may be used to attach respective elements to and/or within the housing and/or to attach respective elements to each other. The proposed connections in particular are advantageous for automated, at least semi-automated assembly of the touchscreen control panel.

Assembly of the touchscreen control panel can be accomplished in comparatively simple steps. In one assembly step, the bracket frame may be attached to or generated together with the cover plate. In another assembly step, the touchsensitive layer can be applied to the cover plate, in particular by gluing. Finally, all the remaining elements and components can be mounted to the cover plate. Here, it may be advantageous that respective remaining or residual elements or components are attached or mounted to the housing such that they can be mounted together with the housing to the bracket frame in a single mounting step. Mounting respective elements to the housing may be accomplished by snap-locking, shape-locking and/or press-locking connections.

It shall be noted, that assembly of the housing and preparation of the cover plate may be conducted in parallel and/or independent assembly steps. This may be advantageous for cost and time efficient manufacture.

Exemplary embodiments will now be described in connection with the annexed figures, in which FIG. 1 shows a front view of a baking oven comprising a touchscreen control panel;

In the figures, like elements will be designated with like reference signs, as far as not otherwise stated.

Figure 1:
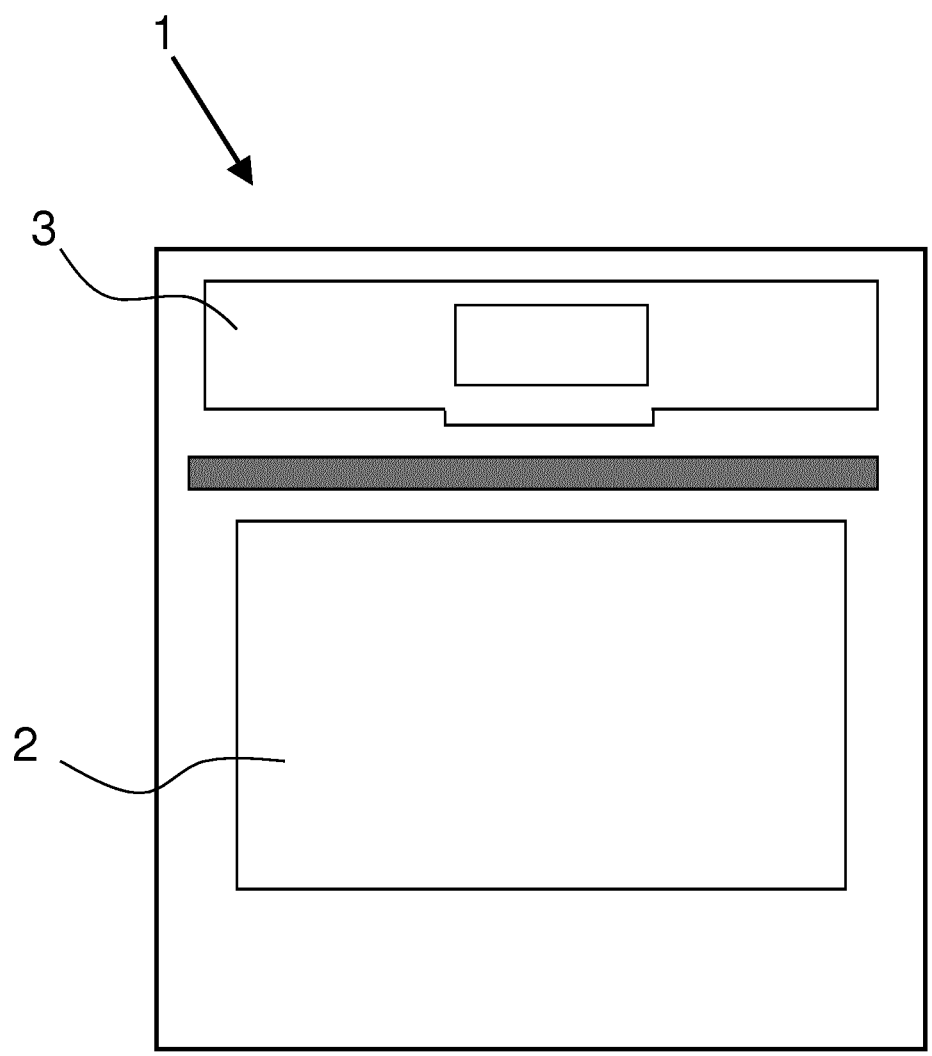

FIG. 1 shows a baking oven 1 comprising an oven muffle 2 for baking and/or steaming food items. The baking oven 1 further comprises a touchscreen control panel 3. The touchscreen control panel 3 is provided in an upper section of the baking oven 1 in connection with a cover plate providing a user interface in particular allowing a user to control operation of the baking oven 1. In this respect, the touchscreen control panel 3 can be regarded as a user control unit for the baking oven 1.

Figure 2:
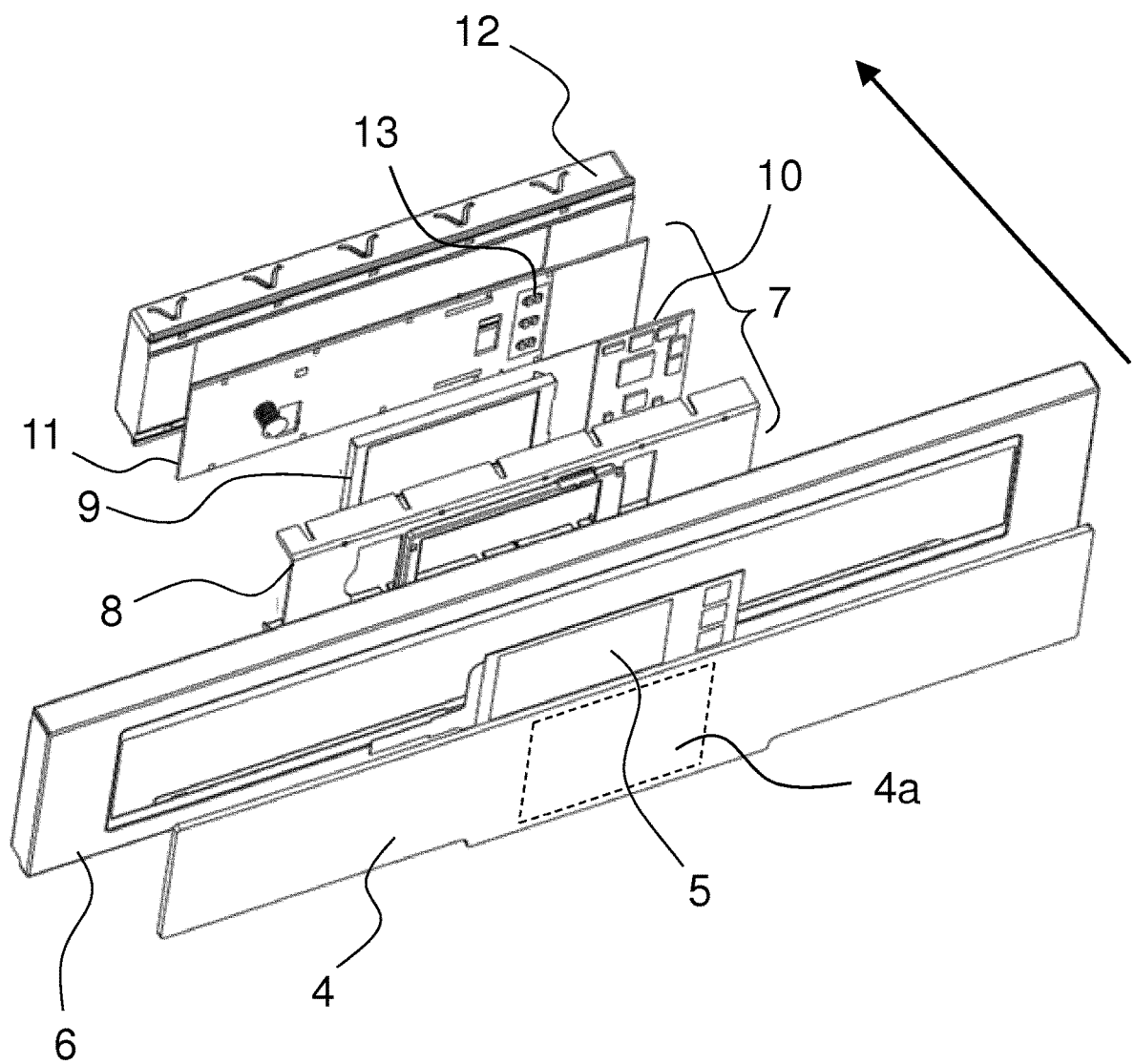
FIG. 2 shows an exploded view of the touchscreen control panel.

FIG. 2 shows an exploded view of the touchscreen control panel 3. The touchscreen control panel 3 comprises, essentially in sequence from front to back, which is indicated by an arrow, the component parts as listed below.

The touchscreen control panel 3 comprises a cover plate 4, which in the present case is implemented as a glass panel or glass plate. The cover plate 4 comprises a transparent section 4a, indicated by a dotted rectangle. The touchscreen control panel 3 further comprises a touch sensitive panel 5 laminated to a back side of the cover plate 4, and a bracket frame 6 to which the cover plate 4 in the present case is attached by gluing, i.e. adhesive bonding.

The touchscreen control panel 3 further comprises a display unit 7 which in turn comprises a housing 8, and a TFT display screen 9 and further a main electrics board 10 and a bridging board 11. The housing may optionally comprise a back cover 12.

Figure 3:
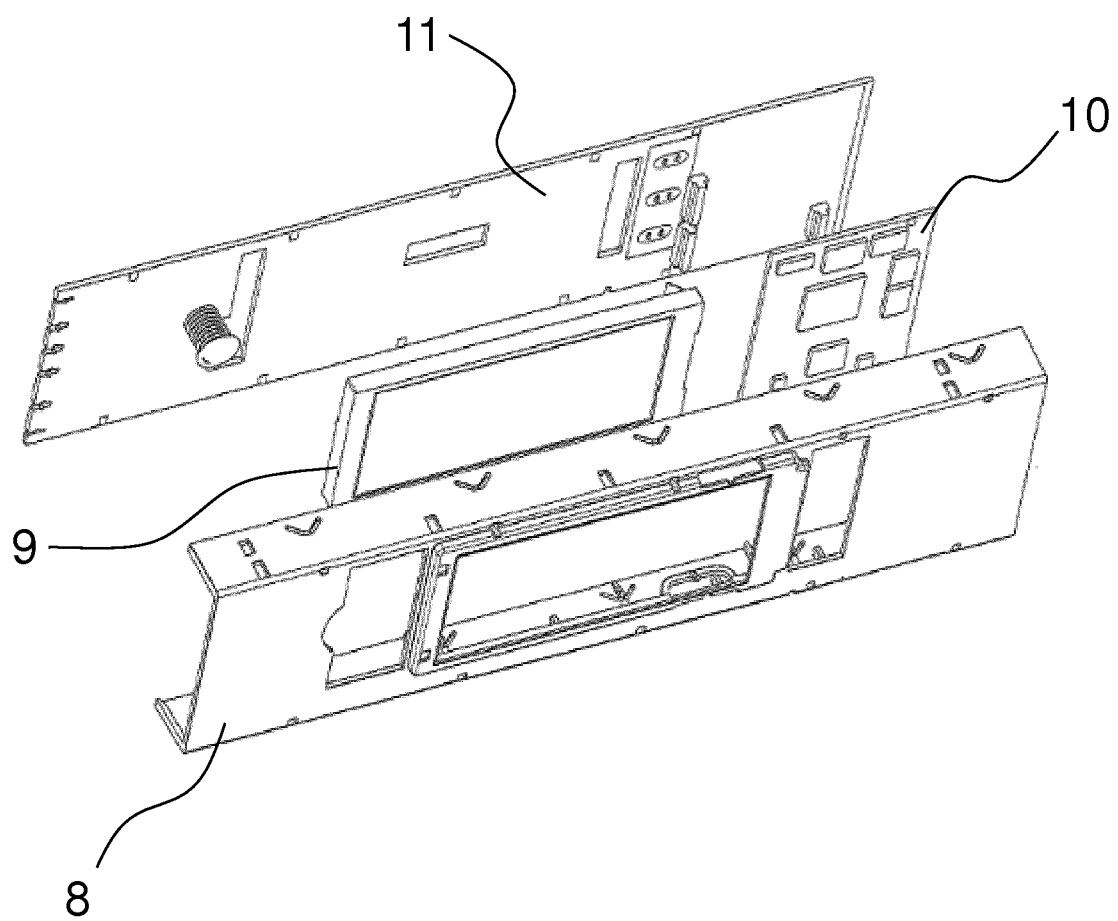
FIG. 3 shows an exploded view of selected elements of the touchscreen control panel.

FIG. 3 shows an exploded view of the display unit 7 of the touchscreen control panel 3. As can be seen, the display unit 7 comprises a restricted number of components, in particular components for providing a display function to the touchscreen control panel 3. Advantageously, the construction of the display unit 7 is comparatively compact, so that the display unit 7 can easily be handled as a separate component part of the touchscreen control panel 3. Advantages will become apparent in connection with the following description and also from the description further above, to which explicit reference is made. In particular it will become apparent, that mounting and assembly of the touchscreen control panel 3 as proposed herein can be greatly enhanced and simplified.

The touchscreen control panel 3 can be assembled essentially in two mounting phases, wherein in a fist mounting phase the display unit 7 is assembled and in a second mounting phase, the display unit 7 is assembled to and with the other elements and component parts of the touchscreen control panel 3.

In the first mounting phase, the display unit 7 is assembled by mounting the display screen 9 to the housing 8. Snap-fit connections or similar may be provided for fixing the display screen 9 to the housing 8. It is however also possible, that the display screen is fixed by further components to be attached to the housing 8.

After or simultaneously with assembling the display screen 9 to the housing 8, the core electrical board 10 can be attached to the housing 8 or to the bridging board 11. For establishing a respective connection, in particular mechanical and electrical connections, counterpart and complementary electrical connectors 13 may be used. The electrical connectors 13 in the present case are provided in order to interconnect electrical and/or data lines of the core electrical board 10 with corresponding electrical and/or data lines on or at the bridging board 11 in the course of assembling the display unit 7.

The main electronics board 10 and bridging board 11 may be connected to the housing 8 via snap-fit connections, for example. The bridging board 11 and core electronics board 10 may be separately attached to the housing 8. As already indicated the electronics board 10 and bridging board 11 may first be attached to each other and then mounted to the housing 8. As can in particular be seen from FIG. 3, the display screen 9 in the present embodiment is sandwiched and fixed between the bridging board 11 and housing 8.

The display screen 9 can be connected to respective display electronics, in particular the main electronics board 10, via a cable connection, in particular a flat cable connection. The display electronics preferably are positioned on the main electrical board 10. However, it also possible that electrical contacts between the display screen 9 and the main electronics board 10 is automatically established during mounting respective components to the housing 8.

In a second mounting phase, which in the present case is carried out as a whole subsequent to the first mounting phase, the touchscreen control panel 3 is finally assembled.

In a first step in particular belonging to the second mounting phase, the touch sensitive panel 5 is laminated to the rear side of the cover plate 4 in proper alignment and overlap with the transparent section 4a.

Subsequently, the cover plate 4 together with the touch sensitive panel 5 is attached to the bracket frame 6. Preferably, a bonding connection, in particular an adhesive bond, is used for connecting the cover plate 4 to the bracket frame 6.

In a next step, the housing 8, i.e. the display unit 7 is snap-connected to the bracket frame 6. It shall be noted that the bracket frame 6 and housing 8 respectively comprise corresponding snap elements adapted to snap-lock the housing to the bracket frame 6. The snap elements are provided in such a way that the display screen 9 is properly aligned with the touch sensitive panel 5 and transparent section 4a.

Note that the steps of the second mounting phase described so far can also be carried out prior to and/or parallel to the first mounting phase.

In particular from FIG. 2 it can be seen, that the cover plate 4 together with the touch sensitive panel 5 are mounted from a front side of the bracket frame 6, whereas the display unit 7 is mounted from a rear side of the bracket frame 6.

It shall be noted, that the snap-fit connections may be replaced or supplemented by other means of fixation. However, snap-fit connections are advantageous with respect to reducing assembly time and effort.

The housing 8 and bracket frame 6 of the touchscreen control panel 3 may be made at least one of a plastic material and metal material. Preferably, the bracket frame 6 is made from a metal material, in particular stainless steel. The cover plate 4 may be made from glass. As can be seen from FIG. 2, the cover plate 4 is clearly larger than the transparent section 4a. In the regions outside of the transparent section 4a, a non-transparent masking or imprint may be applied to the cover plate 4.

It shall be noted, that the proposed structure of the touchscreen control panel can be applied also to other appliances, in particular such as washing machines, dishwashers, cooking hobs.

In particular with cooking hobs having glass ceramic hobs, i.e. glass ceramic panes, the cover plate may be implemented with, i.e. constitutes a section of the glass pane. The transparent section in this case may be a transparent section of the glass ceramic pane. Such a transparent section in particular may be obtained in providing a transparent insert or inlay to a colored glass ceramic pane. In the alternative, the glass ceramic pane may be made from transparent material and regions outside the transparent section, intended to be non-transparent may be obtained by adequately masking the transparent glass material. For masking, foils, imprints or printings can be used.

Figure 4:
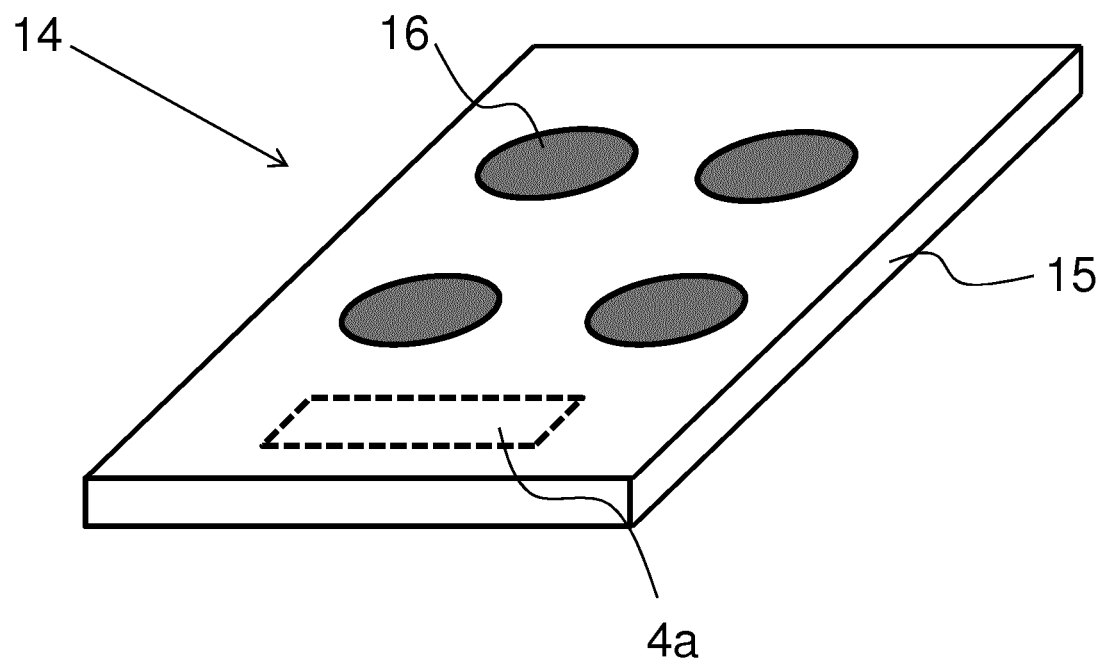
FIG. 4 shows a perspective view of a cooking hob comprising a touchscreen control panel.

FIG. 4 shows a perspective view of a cooking hob 14 comprising a touchscreen panel 3 as proposed herein. The cooking hob comprises a ceramic glass pane 15 and four cooking zones 16. The glass pane 15 comprises a transparent section 4a underneath of which a transparent touch sensitive panel (not explicitly shown) and a display unit 7 are provided.

The transparent section 4a may be obtained by providing a transparent inlay, if necessary in connection with a suitable frame member, to the glass pane 15, or by using a transparent glass material for the glass pane 15. In case of using a transparent glass material non-transparent regions may be obtained by a masking provided at the lower side of the glass pane 15, for example.

Figure 5:
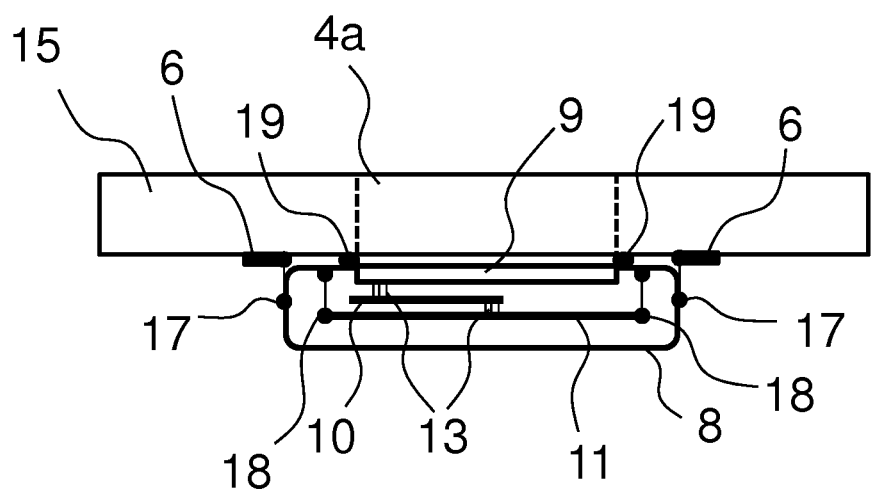
FIG. 5 shows a cross section of the cooking hob.

Reference is now made to FIG. 5 showing a cross sectional view of the cooking hob 14. As can be seen, the transparent section 4a and the display screen 9 of the display unit 7 are mutually aligned such that the display screen 9 is visible through the transparent section 4a, and through the transparent touchsensitive panel (not explicitly shown). The transparent touchsensitive panel is glued to the lower side of the glass pane 15.

The display unit 7, in particular the housing 8 of the display unit 7 is snap connected to a bracket frame 6 itself glued to the lower side of the glass pane 15. The bracket frame 6 and the housing 8 comprise corresponding snap elements 17 adapted and configured to snap-lock the display unit 7 to the lower side of the glass pane 15 in proper alignment with the transparent section 4a and the touchsensitive panel.

The display screen 9, main electronics board 10 and bridging board 11 are mounted to the housing 8 via further snap elements 18 and/or electrical connectors 13. Electric contact between the electrical connectors 13 of the display screen 9, main electronics board 10 and bridging board are automatically established in the course of assembling the housing 8 and display unit 7, respectively. Electronic contacts between the touchsensitive panel (not shown) and the electronics, i.e. the main electronics board 10 and/or the bridging board 11, are configured to be automatically connected to corresponding contact elements in the course of snapping the housing 8, i.e. display unit 7 to the bracket frame 6.

As can be seen from FIG. 5, the display screen 9 is arranged at a predefined distance from the lower side of the glass pane 15. In order to avoid the display screen 9 from getting dusty, a circumferential sealing element 19 is provided to seal the gap between the display screen 9 and the lower side of the glass pane 15, in particular touchsensitive pane.

As will readily be recognized, from the above description, the proposed touchscreen control panels, are well suitable for solving the underlying problems.

LIST OF REFERENCE NUMERALS 1 baking oven
2 oven muffle
3 touchscreen control panel
4 cover plate
4a transparent section
5 touch sensitive panel
6 bracket frame
7 display unit
8 housing
9 display screen
10 main electronics board
11 bridging board
12 back cover
13 electrical connector
14 cooking hob
15 ceramic glass pane
16 cooking zone
17 snap elements
18 further snap elements
19 sealing element

The invention claimed is:

1. A touchscreen control panel configured to be implemented with a kitchen appliance, and operable from a front or top side of the kitchen appliance, wherein the touchscreen control panel comprises: a cover plate with a transparent section,
   a transparent touch-sensitive layer arranged and attached within the transparent section to a back side of the cover plate,
   a bracket frame implemented at the back side of the cover plate and surrounding at least partially the transparent section,
   a display unit comprising an active display, and
   a housing supporting the display unit, said display unit being attached to a back side of the housing such that a display surface of the active display is visible through a cutout window provided in the housing, wherein the housing is removably connected to the bracket frame,
   at least one electronics board supported by the housing,
   wherein the bracket frame is adapted to retain the display unit at the back side of the cover plate in such a way that the display unit is in alignment with the touch-sensitive layer,
   wherein the housing, the electronics board and the touch-sensitive layer are configured such that electronic contacts between the touch-sensitive layer and electronics board are automatically established upon mounting the housing to the bracket frame.

2. The touchscreen control panel according to claim 1, wherein the touch-sensitive layer is glued to the back side of the cover plate.

3. The touchscreen control panel according to claim 1, wherein the cover plate comprises a frame member surrounding the transparent section.

4. The touchscreen control panel according to claim 3, wherein the transparent section is implemented as or as a part of an inlay.

5. The touchscreen control panel according to claim 4, wherein the inlay covers a cutout provided in the bracket frame or frame member.

6. The touchscreen control panel according to claim 1, wherein the housing and bracket frame comprise corresponding fixing elements configured such that the housing can be removably connected to the bracket frame.

7. The touchscreen control panel according to claim 1, wherein the at least one electronics board is configured to at least drive the active display of the display unit.

8. The touchscreen control panel according to claim 7, wherein at least one of the at least one electronics board is arranged besides or behind the active display.

9. The touchscreen control panel according to claim 7, wherein the housing, the active display and at least one of the at least one electronics board are configured such that electric contacts between the active display and electronics board are automatically connected during assembly of the housing.

10. The touchscreen control panel according to claim 1, wherein the bracket frame and housing are configured such that the display surface is arranged at a predefined distance from the touch-sensitive layer, wherein a circumferential gap between the display surface and touch-sensitive layer is sealed by a sealing element.

11. A kitchen appliance comprising a touchscreen control panel according to claim 1.

12. A cooking hob comprising a cooktop with a glass pane and the touchscreen control panel according to claim 1, wherein the transparent section is integrally formed with the glass pane of the cooktop, or formed as an insert embedded in the glass pane.

13. An oven with the touchscreen control panel according to claim 1.

14. The touchscreen control panel according to claim 3, said frame member holding the transparent section.

15. The touchscreen control panel according to claim 4, said transparent section being attached to or integrally designed with said bracket frame or frame member.

16. The touchscreen control panel of claim 6, said fixing elements being snap elements such that said housing is or can be removably snap connected to the bracket frame.

17. The cooking hob of claim 12, said glass pane being a ceramic glass pane.

18. The touchscreen control panel of claim 1, where the active display comprises an electronic display screen adapted to display information that is relevant for operating the kitchen appliance.

19. The touchscreen control panel of claim 1, wherein the cover plate is a glass plate, glass pane, or a plate made of a plastic material, and the bracket frame is made of a plastic material or a metal material.

20. The touchscreen control panel of claim 19, wherein the cover plate is implemented as an inlay and is received within a cutout provided in the bracket frame.

* * * * *